March 24, 1970 S. E. WOMACK 3,501,959
PRESSURE SENSING APPARATUS
Filed Feb. 11, 1969 3 Sheets-Sheet 1

INVENTOR
Sherman E. Womack.

By Norton Lesser
Attorney

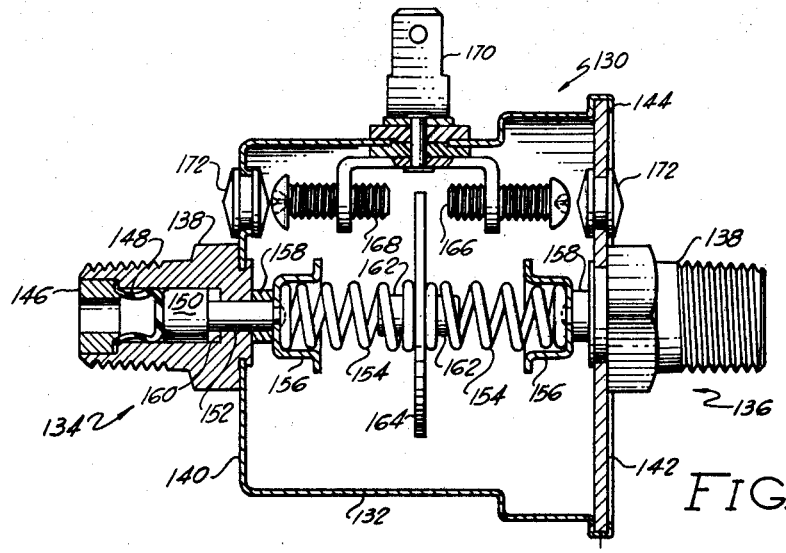

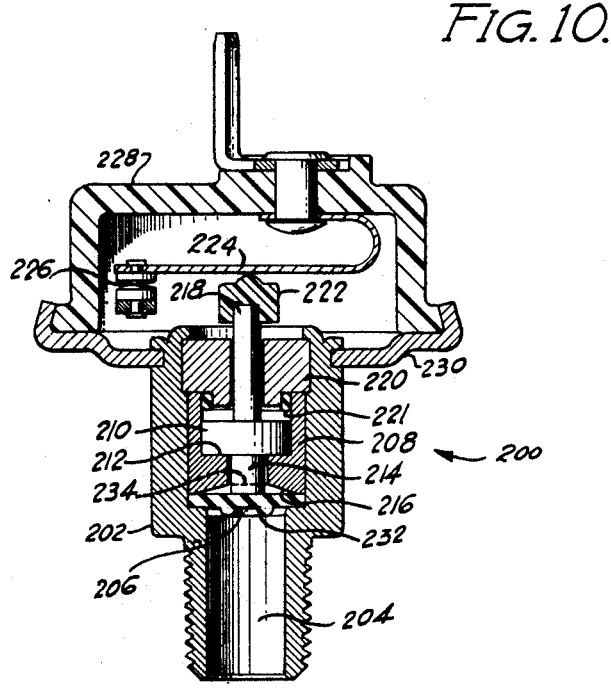

United States Patent Office 3,501,959
Patented Mar. 24, 1970

3,501,959
PRESSURE SENSING APPARATUS
Sherman E. Womack, Springfield, Ill., assignor to Stewart-Warner Corporation, Chicago, Ill., a corporation of Virginia
Continuation-in-part of application Ser. No. 633,006, Apr. 24, 1967. This application Feb. 11, 1969, Ser. No. 801,240
Int. Cl. G01l 7/16
U.S. Cl. 73—395
14 Claims

ABSTRACT OF THE DISCLOSURE

This disclosure includes a rubber diaphragm sealed in a small diameter bore and easily expandible on the application of pressure to one side thereof for operating a pressure indicating device such as a switch or gauge with the diaphragm supported on all low pressure surfaces to prevent rupture.

BACKGROUND OF THE INVENTION

Field of the invention

This application is a continuation-in-part of abondoned application Ser. No. 633,006, filed Apr. 24, 1967, and the invention relates in general to pressure sensing devices and more particularly to an improved diaphragm assembly for either pressure gauges or pressure switches.

Description of the prior art

Pressure gauges or switches are used to indicate pressures ranging from, for example, as low as 10 to 50 p.s.i., but are often subject to pressures as high as 3000 p.s.i. depending on the application. A sealed diaphragm is interposed between the source of high pressure and atmospheric pressure and the diaphragm responds to the high pressure by moving an indicator or switch to indicate the pressure level. At pressures above 100 p.s.i., for example, the use of rubber or other relatively flexible materials as a diaphragm has been impractical since these materials will not survive. Rubber diaphragms are also difficult to hold in sealing engagement with the wall of the small diameter bores used in such instruments as these bores are often less than ½" in diameter.

Thin metal diaphragms which must be soldered or otherwise sealingly joined to a housing are therefore generally used. The metal diaphragms are fabricated with corrugations to facilitate their stretching in correspondence with the applied pressure to provide the desired indication. The necessity of soldering and corrugating the metal diaphragms presents difficult manufacturing problems. In addition the metal diaphragms are subject to fracture, nor do they provide large movements for relatively small pressure changes.

SUMMARY OF THE INVENTION

The present invention proposes to solve the above problens through the use of a relatively flexible diaphragm of a material such as neoprene rubber or the like which is formed in the shape of a cup having a peripheral rim for each insertion and proper seating in the instrument bore. To enable the use of rubber in a high pressure environment the rubber diaphragm is supported on the low pressure or atmospheric side by the spring biased plunger to permit relatively large expansion of the rubber, until the cup expands to a predetermined volume. Thereafter the plunger is engaged by a wall in the bore for rigidly holding the plunger and preventing further expansion and diaphragm rupture in the event further pressure increases occur. To hold the rubber in sealed engagement with the small diameter bore used in pressure indicating instruments, the peripheral rim or flange is compressed between a wall of the bore and a press fit bushing having a tang to prevent extrusion of the rubber from between the wall and bushing.

An improved rubber diaphragm assembly is also disclosed for responding to normal high pressures, while providing protection against fracture or extrusion.

Accordingly, it is a primary object of the present invention to provide an improved pressure gauge or the like.

It is another object of the present invention to provide an improved diaphragm formed of rubber or the like for use in pressure sensing devices.

It is still another object of the present invention to provide an improved diaphragm assembly including a relatively flexible material such as rubber for use in responding to low pressures and supporting structure for preventing the rupture of the rubber on the application of high pressure.

It is yet another object of the present invention to provide improved apparatus for sealing a rubber diaphragm in a small diameter bore.

Other objects and features of this invention will become apparent on examination of the following specification and claims together with the drawings.

BRIEF DESCRIPTION OF THE DRAWINGS

FIG. 6 is a sectional view of a differential pressure switch;

FIG. 7 is an end elevational view of the differential pressure switch shown in FIG. 6.

FIG. 8 is a sectional view of one form of the rubber diaphragm seal used in the present invention;

FIG. 9 is a sectional view of another type of rubber cup used in the present invention; and FIG. 10 is a sectional view of another plunger assembly and a rubber diaphragm for use in responding to a wide range of operating pressures.

Description of one embodiment of the invention

Figure 1:
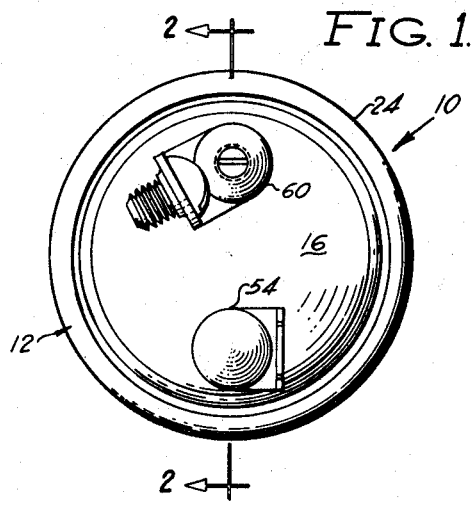
FIG. 1 is an end elevational view of a typical pressure switch incorporating the principles of the present invention.
Figure 2:
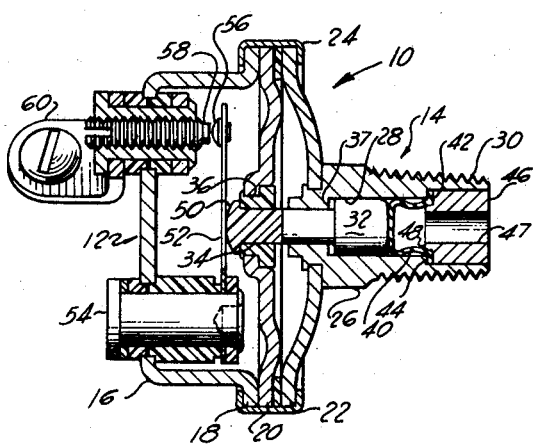
FIG. 2 is a sectional view taken along the line 2—2 in FIG. 1.

In FIGS. 1 and 2, a pressure switch is illustrated therein by the reference character 10. The switch 10 comprises contact assembly 12 and a plunger assembly 14.

The contact assembly 12 includes a cup-shaped housing 16 having an outwardly projecting circular end flange 18 at the open end of the annular housing wall. The flange 18 is engaged against one side of a plunger support disc 20 and the opposite side of the disc 20 is engaged against a plunger assembly support disc 22 with a gasket therebetween. An annular clip 24 is crimped over both the exposed surface of flange 18 and disc 22 so that the clip assumes a U-shaped cross section for holding the contact assembly 12 engaged with the plunger assembly 14.

The disc 22 is provided with a centrally apertured concave portion which engages against a shoulder on a connector 26 and is staked into position thereon. Connector 26 is provided with an internal bore 28 usually less than ½" in diameter and external threads 30 for connecting the switch 10 to a support and a conduit serving as a source of high pressure fluid for the bore 28. A piston 32 supported for axial movement in bore 28 engages a plunger 34 supported for reciprocating movement in a bushing 36 staked in a central aperture of the disc 20. A shoulder 37 at one end of the bore 28 serves as a stop for movement of the piston 32 in one axial direction by engagement with a piston shoulder.

Seated in the bore 28 and sealing the bore and piston from the direct application of high pressure fluid is a diaphragm in the shape of a cup 38 as seen, for example, in FIG. 8 and formed of 50 durometer neoprene rubber. The cup 38 is less than ½″ long and has a back wall for dividing the bore into a low pressure chamber and a high pressure chamber and engaged against piston 32. The annular wall portion 40 or cup 32 is circumferentially dished radially inwardly intermediate its ends to only partially engage against the surface of bore 28 when the fluid pressure is relieved. A radially outwardly extending peripheral rim or flange 42 is provided at the open end of wall 40. The rim 42 is clamped under compression between a wall or shoulder 44 of bore 28 and a sleeve or bushing 46, which is pressed into the bore of connector 26. The bushing 46 has a central passageway 47 for communicating high pressure fluid with the internal surface of cup 38 and an annular tang or projection 48 on one end thereof for overlappingly engaging the internal surface of the annular portion of the cup 38 adjacent rim 44 to prevent the rim 44 from slipping under the compression of bushing 46.

The plunger 34 extends through the staked bushing 36 and its extending end has a button 50 formed thereon for engaging against one side of a cantilever spring blade 52. The bushing 36 is engaged by button 50 under the influence of spring blade 52 and acts as a stop for plunger movement in the direction of cup 38, while the piston 32 engages the back wall of cup 38 under the influence of blade 52.

The blade 52 is supported at one end on a terminal 54, which in turn is carried on the back wall of housing 16. The blade has a contact 56 at the free end thereof. The contact 56 is adapted to engage a contact 58 carried on the end of a screw in terminal 60 so that the position of contact 58 may be adjusted for engagement with contact 56, after the plunger 34 and blade 52 have moved a predetermined distance corresponding to a desired pressure. Both terminals 54 and 60 are conventionally arranged to permit electrical connections to be facilely established thereto for operating an electrical signal or other device on closure of the contacts 56 and 58.

When fluid pressure is applied through the bore 47 in element 46, the annular wall 40 of the cup 38 expands until it completely abuts the surface of the bore 28 while the back wall of the cup applies pressure to the piston 32 for moving the plunger to the left as seen in FIG. 2. The piston 32 initiates movement on the application of pressure to cup 38, however, the initial expansion of cup 38 is largely radial to reduce the possibility of the peripheral edge of the back wall of cup 38 becoming wedged between piston 32 and the wall of bore 28, before the piston initiates its movement. Thereafter the wall of the bore 28 and the piston 32 support the low pressure surfaces of the cup and when the piston engages shoulder 37, movement is terminated, while all low pressure cup surfaces are supported by the rigid connector body. Thus, the switch can respond to low pressures, while extremely high pressures up to, for example, 300 p.s.i. may be applied to the rubber cup 38 without rupturing the same since it is then rigidly supported before its yield point is exceeded. It will be noted that the back wall of the cup 38 is rounded adjacent its outer periphery where it meets the annular wall 40. This also aids in preventing the outer or peripheral edge of the back wall from creeping between the surface of the piston and bore.

Expansion of the cup 38 under pressure drives the plunger 34 against the bias of spring 52 and when the pressure reaches a predetermined value, for example, anywhere from 10 to 50 p.s.i., depending on the contact adjustment, contacts 56 and 58 close to complete a conventional signal or control circuit through terminals 54 and 60 for indicating the pressure.

Another embodiment of the invention

Figure 3:
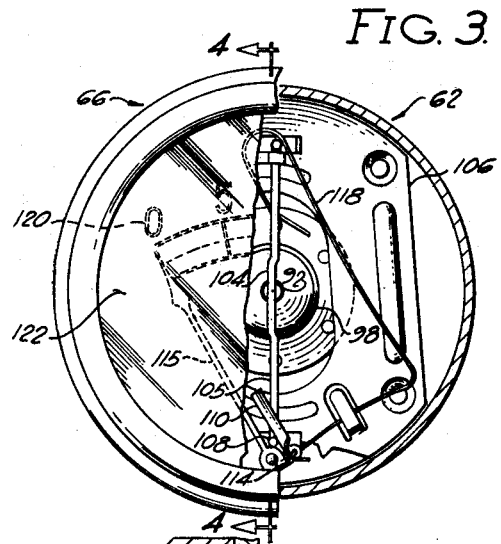
FIG. 3 is a partially broken front elevational view of a pressure gauge incorporating the principles of the present invention.
Figure 4:
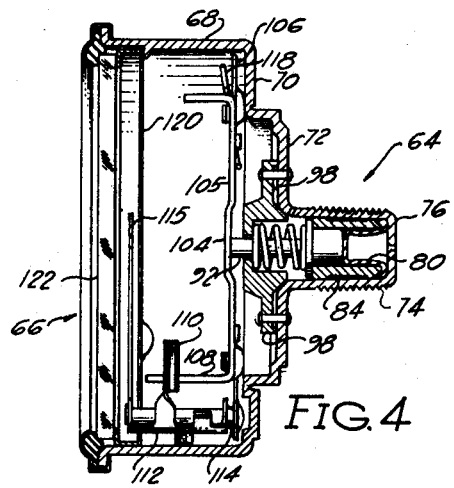
FIG. 4 is a median sectional view of the apparatus shown in FIG. 3.
Figure 5:
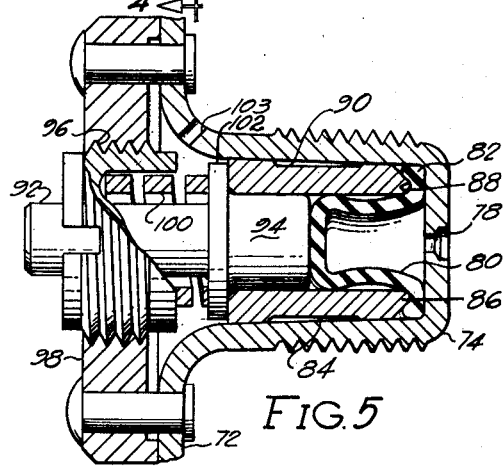
FIG. 5 is an enlarged sectional view of the plunger assembly shown in FIG. 4.

In FIGS. 3 and 4 a pressure gauge is illustrated by the reference character 62. A plunger assembly 64, which is somewhat different than assembly 14 as may be more clearly seen in FIG. 5, is used in pressure gauge 62. The plunger assembly 64 controls a conventional indicator assembly 66.

The plunger assembly 64 is supported on a cup-shaped housing 68. The back wall 70 of the housing has a centrally recessed portion 72 from which an externally threaded hollow boss 74 projects axially rearwardly for fastening the gauge to a suitable support and connecting the gauge to a conduit. The boss 74 has a back wall 76 in which an aperture 78 is formed for communicating high pressure fluid to the interior of the hollow boss 74.

A diaphragm in the form of a cup 80 of neoprene, which is also seen in FIG. 9, is located in the hollow boss 74. A radially outwardly extending rim 82 on the cup 80 abuts the back wall 76 and encircles the aperture 78. A bushing or sleeve 84 is press fit into the hollow boss 74 and encircles the annular wall of the cup. An annular tang 86 on one end of the sleeve 84 engages in an annular recess 88 at the juncture of the rim 82 and the annular wall of the cup 80 to place the rim under compression and extrude a portion of the rim between the tang and the wall of the boss for sealing the portion of the boss exterior to cup 80 from high pressure fluid. The cup 80 in its unexpanded condition has a radially inwardly dished portion formed on its annular wall in a manner similar to cup 38. A cutout portion 90 is formed on the exterior surface of sleeve 84 intermediate the sleeve ends.

A plunger 92 having a piston portion 94 at one end slidingly supported in the bore defined by sleeve 84 is also supported adjacent the other end in a threaded bushing 96 carried in a plate 98. The plate 98 is riveted to the recessed portion 72 of the back wall 70 of housing 68. A spring 100 located between the bushing 96 and one side of shoulder 102 on the plunger serves to bias the piston portion 94 against the back wall of cup 80. The other side of shoulder 102 on the plunger engages the sleeve 84 to limit the movement of piston 94 against the cup. The threaded bushing 96 permits adjustment of the tension on spring 100, while an aperture 103 adjacent the juncture of boss 74 and recessed portion 72 permits pressure relief in the space between shoulder 102 and plate 98.

The plunger 92 engages an offset portion 104 on a conventional crank arm 105 pivotally supported adjacent opposite ends on a plate 106. Plate 106 is riveted to back wall 70 so that it is spaced axially from plate 98. The crank arm 105 has an end arm 108 projecting outwardly from plate 106 for engagement with an arm 110 of a pivot member 112 pivotally carried on a post 114 projecting from plate 106. The pivot member 112 has an indicator needle 115 at one end and its other end is connected to a spring 118 which biases the arm 110 into engagement with arm 108 and biases the needle 114 toward its home or normal position. A graduated dial 120 and a glass plate 122 spaced on opposite sides of needle 114 are secured on housing 68 by means of a bezel 124 conventionally clamped on a peripheral rim 126 formed at the open end of housing 68.

Fluid pressure supplied through opening 78 expands the rubber cup 80 until it completely engages the internal surface of sleeve 84 and expands against the piston 94 to move the plunger 92 against the bias of spring 100. The rim 82 of cup 80 is securely held between the sleeve tang 86 and the wall of boss 74 so that no leakage can occur while all low pressure surfaces of the rubber cup 80 are supported by rigid or solid bodies to prevent the rubber from rupturing. Excess pressure drives the shoulder 102 on plunger 92 against bushing 96 and the rubber is then completely supported against any movement. The rubber cannot rupture therefore unless the applied pressure is at least sufficient to move plate 98 relative wall 72.

Movement of the plunger 92 controls the offset portion 104 of the crank arm 105 in accordance with the applied pressure. The crank arm 105 in turn swings the arm 110 against the bias of spring 118 to pivot needle 115 for indicating the applied pressure in accordance with the needle position relative the dial 120. On relief of the pressure the spring 100 returns the plunger 92 and spring 118 returns the indicator needle 115 together with the crank arm 105 to normal.

Another embodiment of the invention

In FIGS. 6 and 7 a differential pressure switch incorporating the principles of the present invention is indicated by the reference character 130. The switch 130 is of the type used for determining whether the pressure difference between two portions of a hydraulic braking system exceeds permissible limits with the limit usually in the neighborhood of a difference of 100 p.s.i. when the portions are each under a pressure of 2000 p.s.i. The switch 130 includes a housing 132 carrying spaced plunger assemblies 134 and 136 each comprising a connector 138 for fastening to a respective conduit. The housing 132 is generally cup-shaped and one of the connectors 138 is staked in the back wall 140 thereof and the other connector is staked in a plate 142. The plate 142 is in turn secured by a turned over flange 144 in the open end of cup 132.

The plunger assemblies 134 and 136 are each constructed similar to the plunger assembly 14 and each includes a bushing 146 having an annular tang as described for bushing 46 and press fit in the bore of the connector 138 to hold the rim of a respective rubber cup 148 in sealed engagement with a shoulder in the bore. The cups 148 are similar to cup 38 and the back wall of each cup is engaged by the piston portion 150 of a plunger 152 adapted to be axially moved on the application of pressure to the cup 148 against the bias of a spring 154.

One end of each spring 154 is seated in a respective guide cup 156 staked on the end of the respective plunger. A stop 158 limits movement of the plunger in one direction in response to spring pressure and a shoulder 160 in each bore engages the piston portion 150 if the pressure in the respective cup exceeds a desired value to prevent excessive distortion and rupture of the cup on movement of the plunger in the opposite direction against the bias of spring 154. The other end of each spring 154 is supported on a respective guide rod 162 projecting from opposite sides of a floating plate 164.

Plate 164 is adapted to engage either one of screw contacts 166 or 168 depending on which plunger assembly 134 or 136 has the greater pressure applied thereto. When plate 164 engages either contact 166 or 168 a conventional ground connection is extended from the switch support through plate 164 to the screw contact and a terminal 170 connected to each of the screw contacts 166 and 168 through an insulated opening in the annular wall of housing 132 for operating a signal or control device. Screw contacts 166 and 168 may be adjustably positioned relative plate 164 through an opening in housing 132 and plate 142 respectively in accordance with a desired operating pressure differential and the openings thereafter blocked by rubber grommet inserts 172.

Pressure applied through bushings 146 to the diaphragms or cups 148 therefore causes the cups to expand against the springs 154 as the plungers 152 move inwardly while the springs are compressed. With equal pressure applied to each cup, the springs 154 are equally compressed and plate 164 remains generally centered in the position shown. When the fluid pressure in one of the plunger assemblies 134 or 136 exceeds the pressure applied to the other assembly, the plate 164 moves from the mid position to a position approaching one of the contacts 166 or 168 to engage that contact when the pressure difference reaches a predetermined value. The engaged contact then completes the electrical circuit to indicate that the pressure applied to one of the plunger assemblies exceeds the pressure applied to the other by that predetermined amount.

High pressure responsive embodiment

In FIG. 10 a high pressure responsive rubber diaphragm assembly 200 is illustrated. The pressure assembly 200 comprises a generally cylindrical externally threaded housing 202 having a bore 204 for communication with a suitable fluid pressure transmitting conduit. Bore 204 has a first radial shoulder for engagement with one side of a rubber disc diaphragm 206 adjacent the disc periphery. The other side of the diaphragm adjacent the disc periphery is engaged with a diaphragm retainer 208, which is press fit in the enlarged portion of the bore 204.

The diaphragm retainer defines a bore in which a piston 210 is located. Piston 210 is adapted to seat against a shoulder 212 on the diaphragm retainer and has a reduced rod portion 214 extending through a reduced portion of the retainer bore for engaging the low pressure side of the diaphragm 206 adjacent the diaphragm central axis. A conical cutaway or recess defined by a conical wall 216 of the retainer and having a large diameter in facing engagement with the diaphragm is provided in the retainer encircling the piston portion 214.

The end of the piston 210 opposite portion 214 is also provided with a reduced portion 218, which extends through an opening in a piston guide 220. The piston guide 220 is held in the housing 202 by a crimped end on the housing with one end of the guide butting the end of the retainer 208. A reduced portion on one end of the guide seats in the retainer bore and an O-ring safety seal 221 is provided between the guide 220 and the bore of the retainer with the end of the guide serving as a piston stop.

The portion 218 of piston 210 extends through the guide 220 and carries a plastic cap 222 for engagement with a spring blade 224 to control a pair of contacts 226. The blade biases the piston portion 214 against the diaphragm 206 and is carried by the back wall of a cup-shaped housing 228 whose peripheral rim is held by a wall 230 carried adjacent the same end of the housing 202 as guide 220.

The diaphragm 206 is provided with an annular integral ridge or ring 232 on the high pressure side thereof corresponding in diameter to the periphery of the rod portion 214 and coaxial or aligned therewith so that any cutting action exhibited by the periphery of the rod against the rubber is resisted by an area of maximum strength.

When a predetermined fluid pressure is applied through the bore 204 to the diaphragm to actuate contacts 226, the diaphragm moves toward a position shown by the dotted line 234 and enters the conical recess defined by wall 216 to butt against the retainer wall 216. The piston is forced upwardly as seen in FIG. 10 until it engages the guide 220 to move the blade 224 and open the contacts 226. This signals the application of the pressure. Thereafter the diaphragm is held by the piston and by the conical wall of the recess 216, unless a pressure exceeding the value necessary to hold the guide is applied. The conical wall 216 minimizes stretching of the rubber along the wall when high pressure is applied. Pressures suitable for application to diaphragm 206 for operating contacts 226 may range as low as 15 p.s.i. and up to as high as 5000 p.s.i. depending on the stiffness of blade 224 and the diaphragm thickness.

What is claimed is:

1. Pressure gauge apparatus comprising a piston, means having an internal bore for slidingly receiving said piston with said piston contiguous with said bore and coextensive with the cross section of said bore, a rubber diaphragm for separating said bore into a high pressure chamber defined by one surface of said diaphragm and a low pressure chamber having said piston and defined by the opposite surface of said diaphragm, means for biasing said piston into engagement with the surface of said diaphragm defining said low pressure chamber, means for securing the periphery of said diaphragm to seal said low pressure chamber from said high pressure chamber, and means for introducing fluid under pressure into said high pressure chamber to expand said diaphragm against said piston for moving said piston against said bias to thereby enable an indication of said pressure with said piston and the wall of said bore contiguous with said piston supporting the total surface area of said diaphragm on said opposite surface against the fluid pressure in said high pressure chamber.

2. Pressure gauge apparatus comprising a piston, means having an internal bore for slidingly receiving said piston with said piston continuous with said bore and coextensive with the cross section of said bore, a rubber diaphragm for separating said bore into a high pressure chamber defined by one surface of said diaphragm and a low pressure chamber having said piston and defined by the opposite surface of said diaphragm, means for biasing said piston into engagement with the surface of said diaphragm defining said low pressure chamber, means for securing the periphery of said diaphragm to seal said low pressure chamber from said high pressure chamber, means for introducing fluid under pressure into said high pressure chamber to expand said diaphragm against said piston for moving said piston against said bias to thereby enable an indication of said pressure with said piston and the wall of said bore contiguous with said piston supporting the total surface area of said diaphragm on said opposite surface against the fluid pressure in said high pressure chamber, and a rigid wall spaced for engaging said moved piston in response to said fluid pressure reaching a value of either 50 p.s.i. or less and thereafter restraining movement of said piston and expansion of said diaphragm across the entire cross section of said bore until said fluid pressure reaches at least 2000 p.s.i.

3. Pressure indicating apparatus comprising a piston, means having an internal bore for slidingly receiving said piston with said piston contiguous with said bore and coextensive with the cross section of said bore, a rubber diaphragm seated in said bore for separating said bore into a high pressure chamber defined by one surface of said diaphragm and a low pressure chamber having said piston and defined by the opposite surface of said diaphragm, means for biasing said piston into engagement with the opposite surface of said diaphragm defining said low pressure chamber with the portion of said piston engaged with said opposite surface being substantially coextensive with the periphery of said bore in said low pressure chamber, means for securing the periphery of said diaphragm to seal said low pressure chamber from said high pressure chamber, means for introducing fluid under pressure into said high pressure chamber to expand said diaphragm against said piston for moving said piston against said bias to thereby enable an indication of said pressure with said opposite surface being completely supported by said engaged piston area and the contiguous wall of said bore in response to said expansion to avoid rupture of said expanded diaphragm, and rigid means for engaging said piston to hold said piston against movement after said diaphragm has expanded to a predetermined position for preventing further expansion of said diaphragm irrespective of a further increase in the pressure of said fluid.

4. Pressure indicating apparatus comprising a piston, means having an internal bore for slidingly receiving said piston a rubber diaphragm having a peripheral rim and seated in said bore for separating said bore into a high pressure chamber defined by one surface of said diaphragm and a low pressure chamber having said piston and defined by the opposite surface of said diaphragm, wall means in said bore engaging one side of said rim, compression means press fit in said bore engaging the opposite side of said rim with said rim held under compression between said wall and compression means under a force only dependent on the extent to which said compression means is press fit in said bore to seal the low pressure chamber of said bore from the high pressure chamber of said bore, means for biasing said piston into engagement with the opposite surface of said diaphragm defining said low pressure chamber with the area of said piston engaged with said opposite surface being substantially coextensive with the cross sectional area of said bore in said low pressure chamber, and means for introducing fluid under pressure into said high pressure chamber to expand said diaphragm against said piston for moving said piston against said bias to indicate said pressure with said opposite surface being completely engaged by said piston area and the wall of said bore in response to said expansion to avoid rupture of said expanded diaphragm.

5. Pressure gauge apparatus comprising a piston, means having an internal bore for slidingly receiving said piston, a rubber diaphragm having a peripheral rim for separating said bore into a high pressure chamber defined by one surface of said diaphragm and a low pressure chamber having said piston and defined by the opposite surface of said diaphragm, wall means in said bore engaging one side of said rim, compression means fit in said bore engaging the opposite side of said rim with said rim held under compression between said wall and compression means under a force dependent on the extent to which said compression means is press fit in said bore to seal the low pressure chamber of said bore from the high pressure chamber of said bore, means for preventing radially inward extrusion of said rim from between said compression and wall means under said force, means for biasing said piston into engagement with the surface of said diaphragm defining said low pressure chamber with the area of said piston engaged with said opposite surface being substantially coextensive with the area of said bore in said low pressure chamber, and means for introducing fluid under pressure into said high pressure chamber to expand said diaphragm against said piston for moving said piston against said bias to indicate said pressure with said opposite surface being completely engaged by said piston area and the wall of said bore in response to said expansion to avoid rupture of said expanded diaphragm.

6. The pressure gauge apparatus claimed in claim 5 in which said radially inward extrusion preventing means comprises an annular tang on said compression means.

7. Pressure indicating apparatus comprising a piston, means having an internal bore for slidingly receiving said piston, a rubber diaphragm having a peripheral rim and seated in said bore for separating said bore into a high pressure chamber defined by one surface of said diaphragm and a low pressure chamber having said piston and defined by the opposite surface of said diaphragm, wall means in said bore engaging one side of said rim, compression means press fit in said bore for engaging the opposite side of said rim with said rim held under compression between said wall and compression means under a force only dependent on the extent to which said compression means is press fit in said bore to seal the low pressure chamber of said bore from the high pressure chamber of said bore, means for biasing said piston into engagement with the surface of said diaphragm defining said low pressure chamber with the area of said piston engaged with said opposite surface being substantially coextensive with the cross sectional area of said bore in said low pressure chamber, means for introducing fluid under pressure into said high pressure chamber to expand said diaphragm against said piston for moving said piston against said bias and thereby enable an indication of said pressure with said opposite surface being completely engaged by said piston area and the wall of said bore in response to said expansion to avoid rupture of said expanded diaphragm, and rigid means for engaging said piston to hold said piston against movement after said diaphragm has expanded to a predetermined position for preventing further expansion of said diaphragm irrespective of a further increase in the pressure of said fluid.

8. Pressure indicating apparatus comprising a piston, means having an internal bore for slidingly receiving said piston, a rubber diaphragm having a peripheral rim and seated in said bore for separating said bore into a high pressure chamber defined by one surface of said diaphragm and a low pressure chamber having said piston and defined by the opposite surface of said diaphragm, wall means in said bore engaging one side of said rim, compression means press fit in said bore for engaging the opposite side of said rim with said rim held under compression between said wall and compression means under a force dependent on the extent to which said compression means is press fit in said bore to seal the low pressure chamber of said bore from the high pressure chamber of said bore, means for preventing the extrusion of said rim from between said compression and wall means under said force, means for biasing said piston into engagement with the surface of said diaphragm defining said low pressure chamber with the area of said piston engaged with said opposite surface being substantially coextensive with the cross sectional area of said bore in said low pressure chamber, means for introducing fluid under pressure into said high pressure chamber to expand said diaphragm against said piston for moving said piston against said bias and thereby enable an indication of said pressure with said opposite surface being completely engaged by said piston area and the wall of said bore in response to said expansion whereby said expanded diaphragm is completely supported on the low pressure side thereof, and rigid means for engaging said piston to hold said piston against further movement after said diaphragm has expanded to a predetermined position for preventing further expansion of said diaphragm irrespective of a further increase in the pressure of said fluid.

9. Pressure indicating apparatus comprising a piston, means having an internal bore for slidingly receiving said piston, means for indicating a predetermined movement of said piston, a rubber cup having an annular wall seated in said bore and a back wall with the external surface of said back wall facing said piston, a peripheral radially outwardly extending rim on the end of said annular wall opposite said back wall, wall means in said bore engaging one surface of said rim, compression means press fit in said bore for engaging the opposite surface of said rim to secure said rim between said wall means and said compression means under a force dependent on the extent to which said compression means is press fit in said bore to seal one side of said bore in communication with the internal surfaces of said cup from communication with the portion of said bore in communication with the external surfaces of said cup, annular means on said compression means for engaging the internal annular surface of said cup adjacent said rim to prevent the extrusion of said rim from between said wall means and said compression means on compression of said rim, means for biasing said piston in one direction for engaging said piston with the external surface of said back wall, means for introducing fluid under pressure to the internal surface of said cup for expanding the annular wall of said cup against said bore and the back wall of said cup against said piston for moving said piston against said biasing means to control said indicating means while the external surface of said cup is supported by the wall of said bore and said biased piston, and shoulder means in said bore for engaging said piston in response to the expansion of said cup beyond a predetermined volume to prevent further movement of said piston in response to an increase in pressure of said fluid whereby all external surfaces of said cup are rigidly supported.

10. The pressure indicating apparatus claimed in claim 9 in which the annular wall of said cup is normally dished radially inwardly intermediate the ends of said annular cup wall.

11. Pressure gauge apparatus comprising a piston, means having an internal bore for slidingly receiving said piston, a rubber cup diaphragm seated in said bore for separating said bore into a high pressure chamber defined by one surface of said diaphragm and a low pressure chamber having said piston and defined by the opposite surface of said diaphragm, an annular rim formed on the open end of said cup with said rim having a recess therein, means for biasing said piston into engagement with the surface of said diaphragm defining said low pressure chamber, a wall engaged with one surface of said rim, a sleeve press fit in said bore and including an annular tang engaged in said recess for extruding said rim radially outwardly to secure the periphery of said diaphragm and seal said low pressure chamber from said high pressure chamber, means for introducing fluid under pressure into said high pressure chamber to expand said diaphragm against said piston for moving said piston against said bias to thereby enable an indication of said pressure with said piston and the wall of said bore supporting the total surface area of said diaphragm on said opposite surface against the fluid pressure in said high pressure chamber.

12. Pressure gauge apparatus comprising a piston, means having an internal bore for slidingly receiving said piston, a rubber cup diaphragm seated in said bore for separating said bore into a high pressure chamber defined by one surface of said diaphragm and a low pressure chamber having said piston and defined by the opposite surface of said diaphragm, an annular rim adjacent the open end of said cup, means for biasing said piston into engagement with the surface of said diaphragm defining said low pressure chamber, a wall engaged with one surface of said rim, a bushing press fit in said bore with said bushing having an annular tang engaging the internal annular surface of said cup adjacent said rim for preventing the radially inward extrusion of said rim to secure the periphery of said diaphragm and seal said low pressure chamber from said high pressure chamber, and means for introducing fluid under pressure into said high pressure chamber to expand said diaphragm against said piston for moving said piston against said bias to thereby enable an indication of said pressure with said piston and the wall of said bore supporting the total surface area of said diaphragm on said opposite surface against the fluid pressure in said high pressure chamber.

13. Pressure gauge apparatus comprising a piston, means having an internal bore for slidingly receiving said piston, a rubber disc diaphragm seated in said bore for separating said bore into a high pressure chamber defined by one surface of said diaphragm and a low pressure chamber having said piston and defined by the opposite surface of said diaphragm, means engaging a portion of said disc adjacent the periphery of said disc for sealingly securing said disc in said bore, means for biasing said piston into engagement with a portion of the surface of said diaphragm defining said low pressure chamber, a conical wall in said low pressure chamber facing said opposite surface of said disc and encircling said piston whereby the introduction of fluid under pressure into said high pressure chamber expands said diaphragm against said piston for moving said piston against said bias to thereby enable an indication of said pressure with said piston and said conical wall supporting the total surface area of said diaphragm on said opposite surface against the fluid pressure in said high pressure chamber, and a ring integrally formed on said one surface of said diaphragm corresponding to the periphery of said piston and aligned with the periphery of said piston.

14. Pressure gauge apparatus comprising a piston, means having an internal bore for slidingly receiving said piston, a rubber disc diaphragm seated in said bore for separating said bore into a high pressure chamber defined by one surface of said diaphragm and a low pressure chamber having said piston and defined by the opposite surface of said diaphragm, means engaging a circumferential portion of said disc adjacent the periphery of said disc for sealingly securing said disc in said bore, means for biasing said piston into engagement with a portion of the surface of said diaphragm defining said low pressure chamber, means in said low pressure chamber cooperating with said piston for supporting the total surface area of said diaphragm on said opposite surface in response to the introduction of fluid under pressure into said high pressure chamber to expand said diaphragm against said piston for moving said piston against said bias to thereby enable an indication of said pressure with said piston, and a ring integrally formed on said one surface of said diaphragm and corresponding to the periphery of said piston and aligned with said piston periphery for supporting said diaphragm along the periphery of said piston.

References Cited

UNITED STATES PATENTS

| | | | |
|---|---|---|---|
| 1,473,171 | 11/1923 | Bowden | 73—409 |
| 2,225,675 | 12/1940 | West | 73—146.8 |
| 2,460,908 | 2/1949 | Scott | 92—99 |
| 2,989,991 | 6/1961 | Knobel | 73—419 |
| 3,285,061 | 11/1966 | Hegenbart | 73—419 |
| 3,289,551 | 12/1966 | Rzepecki | 92—99 |

LOUIS R. PRINCE, Primary Examiner

DENIS E. CORR, Assistant Examiner

U.S. Cl. X.R.

73—406, 419